Patented June 2, 1936

2,043,211

UNITED STATES PATENT OFFICE 2,043,211

THERAPEUTIC PREPARATION

Lewis E. Harris, Lincoln, Nebr., assignor to Norden Laboratories, a corporation of Nebraska No Drawing. Application December 24, 1935, Serial No. 56,079

2 Claims. (Cl. 167—68)

The present invention relates to a new calcium preparation especially adapted for therapeutic use, the preparation being a stabilized form of a calcium gluconate solution which is substantially free from irritant and toxic properties.

Calcium deficiency has long been recognized as the cause for many disorders in both humans and the lower animals. Many calcium preparations have been employed but of all these the gluconate has been found to possess certain advantages over all the others. Despite these advantages, however, there are certain disadvantages in the prior calcium gluconate solutions which largely outweigh the advantages of the calcium gluconate over other calcium preparations.

One of the difficulties is that the calcium gluconate is not readily soluble in water except in weak solution. At room temperatures the solubility of calcium gluconate is probably around 3%. The 3% solution of calcium gluconate is, however, wholly unsuitable for intravenous, intramuscular or subcutaneous injection and this fact has resulted in much work being done on the part of those interested in the art to provide a solution of calcium gluconate which is more highly concentrated and which is stable and which is free from all toxic and irritant properties. The only prior preparation which has proved to be feasible for actual use is a solution of 10% or greater of calcium gluconate with the addition of boric acid as a stabilizer to maintain the solution. This is open to serious objection because of the irritant properties of the boric acid either alone or when used as a stabilizer in the calcium gluconate solution. Experience has shown that calcium gluconate solutions of from 20% to 30% with boric acid as a stabilizer frequently produce induration and occasionally necrosis when administered subcutaneously or shock when injected intravenously, the shock being characterized by vomiting and trembling and occasionally by collapse. My efforts have therefore been directed to the provision of a calcium gluconate solution having a stabilizer which is substantially free from all irritant and toxic properties when used as a stabilizer for such solutions.

I have found that the addition of aluminum chloride in suitable proportions to the calcium gluconate solution stabilizes that solution regardless of the degree of concentration of the solution. The aluminum chloride may be added to the calcium gluconate solution or it may be added to the dry calcium gluconate so that both the calcium gluconate and aluminum chloride may be dissolved in the water at the same time. The order in which the calcium gluconate, aluminum chloride and water are introduced is immaterial since the results appear to be the same regardless of which order is followed.

Merely by way illustration, a 20% solution may be prepared by dissolving 100 pounds of calcium gluconate in 400 pounds of boiling water and adding 15 pounds of aluminum chloride after the calcium gluconate has been dissolved but while the solution is still hot. The same result is obtained if 15 pounds of aluminum chloride are dissolved in 400 pounds of boiling water and 100 pounds of calcium gluconate are added while the solution is still boiling. Still another method resulting in the preparation follows from the mixing of 15 pounds of aluminum chloride with 100 pounds of calcium gluconate and dissolving the mixture in 400 pounds of boiling water. Regardless of the order in which the three are added, agitation is found to facilitate the solution of the calcium gluconate and aluminum chloride in the water. The process may be carried out at atmospheric pressure, under pressure or in vacuo. In all cases the evaporation losses are replaced to make up the total weight to 500 pounds. For clinical reasons the water must be distilled water. In order to prevent bacterial growth and the development of molds in the solution while it is kept in stock, it is advisable to add 1% of formalin or other suitable preservative to the solution.

Whether or not a new compound is formed has not yet been determined but there are several strong indications of the probability of a reaction of the calcium gluconate and aluminum chloride to form a new compound. One of these is that the aluminum chloride apparently loses some of its properties. Aluminum chloride solutions by themselves are violently irritant to animal tissues but the solution of the aluminum chloride with the calcium gluconate in water is substantially devoid of all irritant properties. The calcium gluconate also appears to be much less irritant in the presence of the aluminum chloride.

Aqueous solutions of 10% of calcium gluconate may be made by supersaturation but such solutions are in false equilibrium which makes them undesirable for therapeutic use because of their irregularly diminishing potency and because of the presence of solid particles in the solution. They possess irritant and toxic properties. They may be stabilized by means of boric acid but such stabilization does not materially affect the irritant and toxic properties of the calcium gluconate or of the boric acid. The 10% solution of calcium gluconate is moreover much weaker than is desired for therapeutic use. The problem has been to both stabilize the calcium gluconate solution of the desired concentration and to make the solution non-irritant and non-toxic. The use of the aluminum chloride accomplishes both objects by perfectly stabilizing the calcium gluconate in aqueous solution and by reducing the irritant properties to an insignificant minimum.

The most desirable concentrations of calcium gluconate for therapeutic use are those of 20% and over but regardless of the concentration the solution may be stabilized by the addition of aluminum chloride in the required amounts. Up to about 3% of calcium gluconate in water, the solution will remain stable without the addition of a stabilizer. In the calcium gluconate solutions immediately above 3%, .1 of 1% aluminum chloride will stabilize the solutions since such weak solutions are relatively stable in themselves. In a solution of 50 parts by weight of calcium gluconate in 40 parts by weight of water, about 15 parts by weight of aluminum chloride should be added as a stabilizer. These proportions have been found to be satisfactory but the precise proportions have not yet been fully developed since they depend to a large extent on other factors of the problems which have not yet been fully worked out.

The upper limits of the solubility of calcium gluconate have not yet been determined with precision. The upper limit of the solubility from the commercial and manufacturing standpoint is probably around 60%. The 60% solution as made by laboratory methods is a heavy and sticky mass which may serve as a stock solution to be diluted for use. The difficulties of preparing 60% solutions or the probable solutions of more than 60% are probably too great to make such highly concentrated solutions commercially successful.

Having thus described my new therapeutic preparation and the method by which it is prepared, what I claim as new and desire to secure by Letters Patent of the United States is:

1. In a new therapeutic product, a stabilized aqueous solution of calcium gluconate in which the calcium gluconate is in excess of three per cent, the solution containing aluminum chloride as a stabilizing agent.

2. In a new therapeutic product, a solution of calcium gluconate and aluminum chloride in water, said calcium gluconate being in excess of three per cent. of the solution and said aluminum chloride being not less than one tenth of one per cent. of the solution, said aluminum chloride functioning as a stabilizer for the calcium gluconate in aqueous solution.

LEWIS E. HARRIS.